(12) United States Patent
Gandhi et al.

(10) Patent No.: US 11,041,576 B2
(45) Date of Patent: Jun. 22, 2021

(54) ACTUATOR WITH STATIC ACTIVATED POSITION

(71) Applicant: Toyota Motor Engineering & Manufacturing North America, Inc., Plano, TX (US)

(72) Inventors: Umesh N. Gandhi, Farmington Hills, MI (US); Danil V. Prokhorov, Canton, MI (US); Michael Paul Rowe, Pinckney, MI (US); Ryohei Tsuruta, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 275 days.

(21) Appl. No.: 16/170,571

(22) Filed: Oct. 25, 2018

(65) Prior Publication Data

US 2020/0132213 A1    Apr. 30, 2020

(51) Int. Cl.
*F16K 31/40* (2006.01)
*H02N 1/00* (2006.01)
(Continued)

(52) U.S. Cl.
CPC .......... *F16K 31/404* (2013.01); *H02N 1/006* (2013.01); *F04B 43/09* (2013.01); *F16K 7/045* (2013.01); *F16K 7/10* (2013.01)

(58) Field of Classification Search
CPC ... F16K 7/045; F16K 7/10; F16K 7/12; F16K 31/006; F16K 31/02; F16K 31/025;
(Continued)

(56) References Cited

U.S. PATENT DOCUMENTS 2,241,086 A    1/1939  Gould
4,286,910 A  *  9/1981  Conrad ..................... F16K 7/10
                                                    100/221
(Continued)

FOREIGN PATENT DOCUMENTS

JP    2007097292 A    4/2007
KR  20050056526 A    6/2005
(Continued)

OTHER PUBLICATIONS

Acome et al., "Hydraulically Amplified Self-Healing Electrostatic Actuators with Muscle-Like Performance," Science, vol. 359, Issue 6371, pp. 61-65 (Jan. 5, 2018) (6 pages).
(Continued)

*Primary Examiner* — Kevin F Murphy
*Assistant Examiner* — Jonathan J Waddy
(74) *Attorney, Agent, or Firm* — Christopher G. Darrow; Darrow Mustafa PC

(57) ABSTRACT

Actuators having electroactive valves are described herein. The actuators can move from a first position to a second position and lock in the second position using an electroactive valve. The device can include an actuator having a fluid-impermeable membrane. The fluid-impermeable membrane can define a compartment, the compartment having a central region, an edge region extending from and fluidly connected with the central region, an electroactive valve between the central region and the edge region, and a dielectric fluid. When actuated, the actuators can force fluid through the electroactive valves and into the edge region. Once in the edge region, the electroactive valves can prevent return flow until receiving an actuation signal.

20 Claims, 7 Drawing Sheets

(51) Int. Cl.
*F16K 7/04* (2006.01)
*F04B 43/09* (2006.01)
*F16K 7/10* (2006.01)

(58) Field of Classification Search
CPC .... F16K 31/404; F16K 7/126; F16K 31/0641; F16K 31/0672; F16K 31/0675; F16K 2099/0094; H02N 1/006; F04B 43/04; F04B 43/043; F04B 43/09; F04B 43/14; F04B 45/047; F04B 45/065; F04B 45/067; F04B 45/10
USPC .......................................................... 251/4
See application file for complete search history.

(56) References Cited

U.S. PATENT DOCUMENTS

| | | | |
|---|---|---|---|
| 4,319,427 A | 3/1982 | Way, Jr. | |
| 4,726,656 A | 2/1988 | Schofield et al. | |
| 5,065,978 A | 11/1991 | Albarda et al. | |
| 6,065,978 A | 5/2000 | Dehan et al. | |
| 6,120,002 A * | 9/2000 | Biegelsen | B65H 5/228 251/129.01 |
| 6,215,221 B1 | 4/2001 | Cabuz et al. | |
| 6,490,960 B1 | 12/2002 | Jackson et al. | |
| 6,685,442 B2 | 2/2004 | Chinn et al. | |
| 6,939,291 B2 | 9/2005 | Phee Soo Jay | |
| 7,353,747 B2 | 4/2008 | Swayze et al. | |
| 7,484,735 B2 | 2/2009 | Verbrugge et al. | |
| 7,521,840 B2 | 4/2009 | Heim | |
| 7,673,562 B2 | 3/2010 | Pattekar et al. | |
| 7,892,630 B1 | 2/2011 | McKnight et al. | |
| 7,901,524 B1 | 3/2011 | McKnight et al. | |
| 7,905,538 B2 | 3/2011 | Ukpai et al. | |
| 8,222,799 B2 | 7/2012 | Polyakov et al. | |
| 8,240,677 B2 | 8/2012 | Browne et al. | |
| 8,272,392 B2 | 9/2012 | Pattekar et al. | |
| 8,430,810 B2 | 4/2013 | Hassidov et al. | |
| 8,863,608 B2 | 10/2014 | Fischer et al. | |
| 9,061,118 B2 | 6/2015 | Shoham et al. | |
| 9,464,642 B2 | 10/2016 | Ilievski et al. | |
| 9,764,113 B2 | 9/2017 | Tuval et al. | |
| 9,790,968 B2 | 10/2017 | Yang et al. | |
| 9,927,786 B2 | 3/2018 | Dewitte | |
| 10,058,647 B2 | 8/2018 | Roche et al. | |
| 10,293,718 B1 | 5/2019 | Ilievski et al. | |
| 10,631,083 B1 | 4/2020 | Gandhi et al. | |
| 10,640,033 B1 | 5/2020 | Gandhi et al. | |
| 10,682,903 B1 | 6/2020 | Gandhi et al. | |
| 10,682,931 B2 | 6/2020 | Rowe et al. | |
| 2002/0100888 A1 * | 8/2002 | Sharma | F16K 99/0015 251/11 |
| 2004/0107829 A1 | 6/2004 | Davis et al. | |
| 2004/0261411 A1 | 12/2004 | MacGregor | |
| 2005/0045480 A1 * | 3/2005 | Krumme | G05D 7/0635 204/639 |
| 2005/0198904 A1 | 9/2005 | Browne et al. | |
| 2005/0206096 A1 | 9/2005 | Browne et al. | |
| 2006/0038745 A1 | 2/2006 | Naksen et al. | |
| 2006/0159568 A1 * | 7/2006 | Lutz | F04B 43/12 417/412 |
| 2007/0046074 A1 | 3/2007 | Satta et al. | |
| 2007/0120438 A1 * | 5/2007 | Divoux | H02N 1/006 310/309 |
| 2007/0246898 A1 | 10/2007 | Keefe et al. | |
| 2009/0086331 A1 | 4/2009 | Gunasekaran et al. | |
| 2009/0115285 A1 | 5/2009 | Najafi et al. | |
| 2010/0254837 A1 | 10/2010 | Boersma et al. | |
| 2010/0258362 A1 | 10/2010 | Trimmer | |
| 2011/0188258 A1 | 8/2011 | Tajima | |
| 2012/0177506 A1 * | 7/2012 | Orter | F04B 43/04 417/53 |
| 2012/0287493 A1 | 11/2012 | Kuhlman et al. | |
| 2013/0255815 A1 * | 10/2013 | Brinkmann | F15C 3/04 138/46 |
| 2013/0304049 A1 | 11/2013 | Behnke, II et al. | |
| 2013/0318962 A1 | 12/2013 | Joshi et al. | |
| 2015/0320958 A1 * | 11/2015 | Metysek | A61M 16/20 128/204.21 |
| 2015/0331156 A1 | 11/2015 | Hirsa | |
| 2016/0052131 A1 | 2/2016 | Lessing et al. | |
| 2016/0106620 A1 | 4/2016 | Uno et al. | |
| 2017/0150252 A1 | 5/2017 | Trestain et al. | |
| 2017/0198687 A1 * | 7/2017 | Scholten | F04B 45/047 |
| 2018/0036198 A1 | 2/2018 | Mergl et al. | |
| 2018/0172172 A1 * | 6/2018 | Oehler | F16K 31/025 |
| 2018/0339624 A1 | 11/2018 | Leck | |
| 2019/0023161 A1 | 1/2019 | Sullivan et al. | |
| 2019/0032684 A1 | 1/2019 | Kowalewski et al. | |
| 2019/0059608 A1 | 2/2019 | Yan et al. | |
| 2019/0232822 A1 | 8/2019 | Hintermaier | |
| 2019/0296217 A1 | 9/2019 | Jung et al. | |
| 2020/0032822 A1 | 1/2020 | Keplinger et al. | |
| 2020/0130202 A1 | 4/2020 | Gandhi et al. | |
| 2020/0130321 A1 | 4/2020 | Gandhi et al. | |
| 2020/0132223 A1 | 4/2020 | Prokhorov et al. | |
| 2020/0136525 A1 | 4/2020 | Gandhi et al. | |
| 2020/0136526 A1 | 4/2020 | Gandhi et al. | |
| 2020/0156314 A1 | 5/2020 | Rowe et al. | |
| 2020/0182269 A1 | 6/2020 | Rowe | |
| 2020/0189469 A1 | 6/2020 | Gandhi et al. | |
| 2020/0216121 A1 | 7/2020 | Gandhi et al. | |
| 2020/0238854 A1 | 7/2020 | Gandhi et al. | |
| 2020/0259426 A1 | 8/2020 | Rowe | |

FOREIGN PATENT DOCUMENTS

| | | |
|---|---|---|
| WO | 2017077541 A1 | 5/2017 |
| WO | 2018175741 A1 | 9/2018 |

OTHER PUBLICATIONS

Extended European Search Report for European Application No. 19205439.3-1010, dated Feb. 7, 2020 (8 pages).
Yang et al., "Novel Design and Three-Dimensional Printing of Variable Stiffness Robotic Grippers," Dec. 2016, ASME Journal of Mechanisms and Robotics, vol. 8, pp. 061010-1 to 061010-15 (15 pages).
SMC Tech, "Precision Regulator: Series IR1000/2000/3000", SMC Tech, pp. 713-725 and 1-19, 2015 (53 pages).
Acome et al., "Hydraulically Amplified Self-Healing Electrostatic Actuators with Muscle-Like Performance," Science, vol. 359, Issue 6371, 61-65 (2018).
Shintake et al., "Soft Robotic Grippers," Wiley Online Library, 1-59 (2018).
Knoss, "Next-gen flexible robots move and heal like us," CU Boulder Today, Jan. 4, 2018, retrieved from the Internet: <https://www.colorado.edu/today/2018/01/04/next-gen-flexible-robots-move-and-heal-us>, [retrieved Mar. 30, 2018] (6 pages).

* cited by examiner

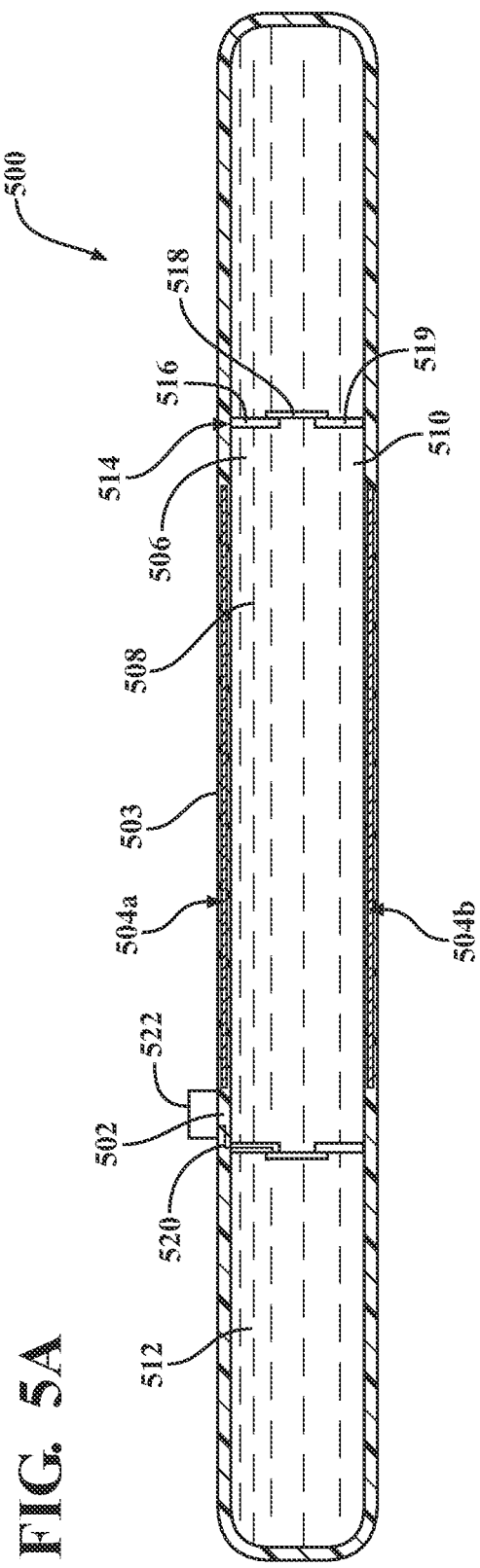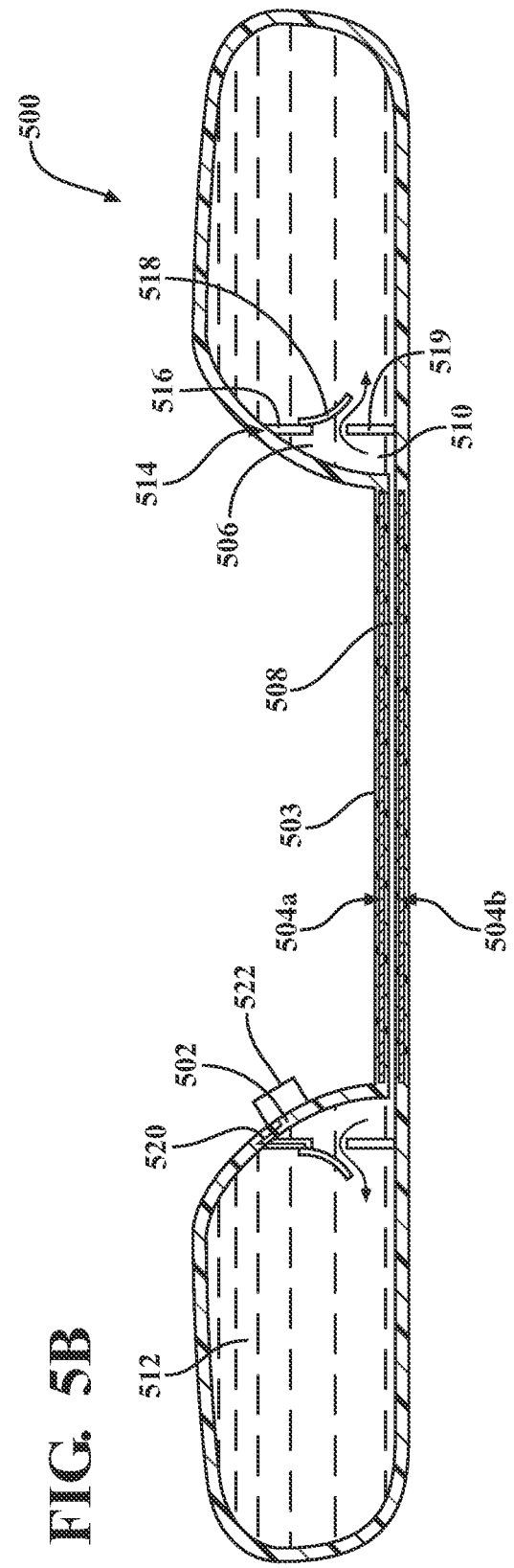

ACTUATOR WITH STATIC ACTIVATED POSITION

TECHNICAL FIELD

The subject matter described herein generally relates to actuators and, more particularly, actuators with a static activated state.

BACKGROUND

Control systems employed for the actuation and positioning of a remote object or the like can include pneumatic, hydraulic and electromechanical systems. These control systems can be used to control the movement of a variety of objects, such as autonomous devices. Each of these types of systems has particular advantages under some conditions. Pneumatic systems can supply force through the delivery of a compressed gas, whereas hydraulic systems rely on minimally compressible liquids. Furthermore, high pressures can be employed which reduces the size of the operating equipment. However, hydraulic fluids are often not fire proof, and hydraulic systems are notorious for leakage and high maintenance, particularly in control applications. Electromechanical systems rely on electrically moveable components, and can include combinations of the previous systems (e.g., electro pneumatic and electro hydraulic systems).

SUMMARY

Disclosed herein is an actuator capable of locking in an actuated position, as well as methods for the same. In one or more implementations, an actuator is disclosed. The actuator can include a fluid-impermeable membrane and a compartment defined by the fluid-impermeable membrane. The compartment can include a central region. The compartment can further include an edge region extending from and fluidly connected with the central region. The compartment can further include a dielectric fluid. The compartment can further include an electroactive valve between the central region and the edge region, the valve being configured to selectively permit movement the dielectric fluid between the central region and the edge region.

In one or more implementations, an actuator is disclosed. The actuator can include a fluid-impermeable membrane having a compartment, and an electroactive valve. The fluid-impermeable membrane can include an insulating portion defining an interior surface and an exterior surface of the fluid-impermeable membrane, the insulating portion comprising an insulating elastomer. The fluid-impermeable membrane can further include a first conducting portion positioned within insulating portion, the first insulating portion comprising a conductive material. The fluid-impermeable membrane can further include a second conducting portion connected to an outer surface of the first insulating portion and separated from the first conducting portion by the insulating portion, the second conducting portion comprising a conductive material. The fluid-impermeable membrane can further include a second insulating portion surrounding an exterior surface of the first conducting portion and the second conducting portion. The compartment can be defined by the interior surface of the fluid-impermeable membrane. The compartment can include a central region. The compartment can further include an edge region extending from and fluidly connected with the central region. The compartment can further include a dielectric fluid. The compartment can further include an electroactive valve between the central region and the edge region.

In one or more implementations, an actuator is disclosed. The actuator can include a membrane. The membrane can include a first conductive portion comprising a conductive material and configured to produce an electric field in response to a first electrical input. The membrane can further include a second conductive portion comprising a conductive material, the second conductive portion being positioned opposite the first conductive portion and configured to attract to the first conductive portion in response to the first electrical input. The membrane can further include an insulating portion comprising an elastomer configured to electrically isolate the first conductive portion from the second conductive portion. The actuator can further include a compartment defined by the membrane and having a dielectric fluid, the compartment being configured to deliver a hydraulic force to the membrane in response to adherence of the first conductive portion and the second conductive portion. The actuator can further include an electroactive valve positioned within the compartment and configured to maintain the hydraulic force on the membrane and release the hydraulic force upon receiving a second electrical input.

BRIEF DESCRIPTION OF THE DRAWINGS

So that the manner in which the above recited features of the present disclosure can be understood in detail, a more particular description of the disclosure, briefly summarized above, may be had by reference to the implementations, some of which are illustrated in the appended drawings. It is to be noted, however, that the appended drawings illustrate only typical implementations of this disclosure and are therefore not to be considered limiting of its scope. The disclosure may admit to other equally effective implementations.

FIGS. 5A-5D are depictions of a series of movements from an example of actuators, according to one or more implementations.

To facilitate understanding, identical reference numerals have been used, wherever possible, to designate identical elements that are common to the figures. Additionally, elements of one or more implementations may be advantageously adapted for utilization in other implementations described herein.

DETAILED DESCRIPTION

The implementations disclosed herein generally relate to an actuator having an electroactive valve. The implementations described here can enable an actuator to maintain an actuated position without further electrical input. The actuator can be configured to remain in an activated position after power to the actuator is turned off. The actuator includes a fluid-impermeable membrane defining a compartment which can contain a dielectric fluid. Within the fluid-impermeable membrane is an electroactive valve. The electroactive valve can include one or more electroactive components that can cover a fluid passage within the compartment of the fluid-impermeable membrane.

Conductive portions (e.g., electrodes) of the actuator can have a deactivated state, such that the electrodes do not compress the fluid-impermeable membrane. Power can be supplied to the electrodes, causing the electrodes to move toward each other, to have an activated state. As a result, the compartment of the fluid-impermeable membrane is compressed, and the dielectric fluid is squeezed to an outer edge region of the membrane, passing through the electroactive valve. When the electroactive valve is not activated, the fluid flows through the valve in one direction. As such, the electroactive valve can permit fluid flow through the valve in the direction from a central portion of the compartment to an outer edge region of the compartment. The flow of the dielectric fluid through the electroactive valve can cause the outer edge region of the compartment to bulge/stretch to accommodate the dielectric fluid. As the electroactive valve does not allow flow in the opposite direction, the dielectric fluid is trapped in the outer edge region of the compartment until the electroactive valve is activated to allow reverse flow. The implementations disclosed herein are described in more detail with reference to the figures below.

Figure 1A:
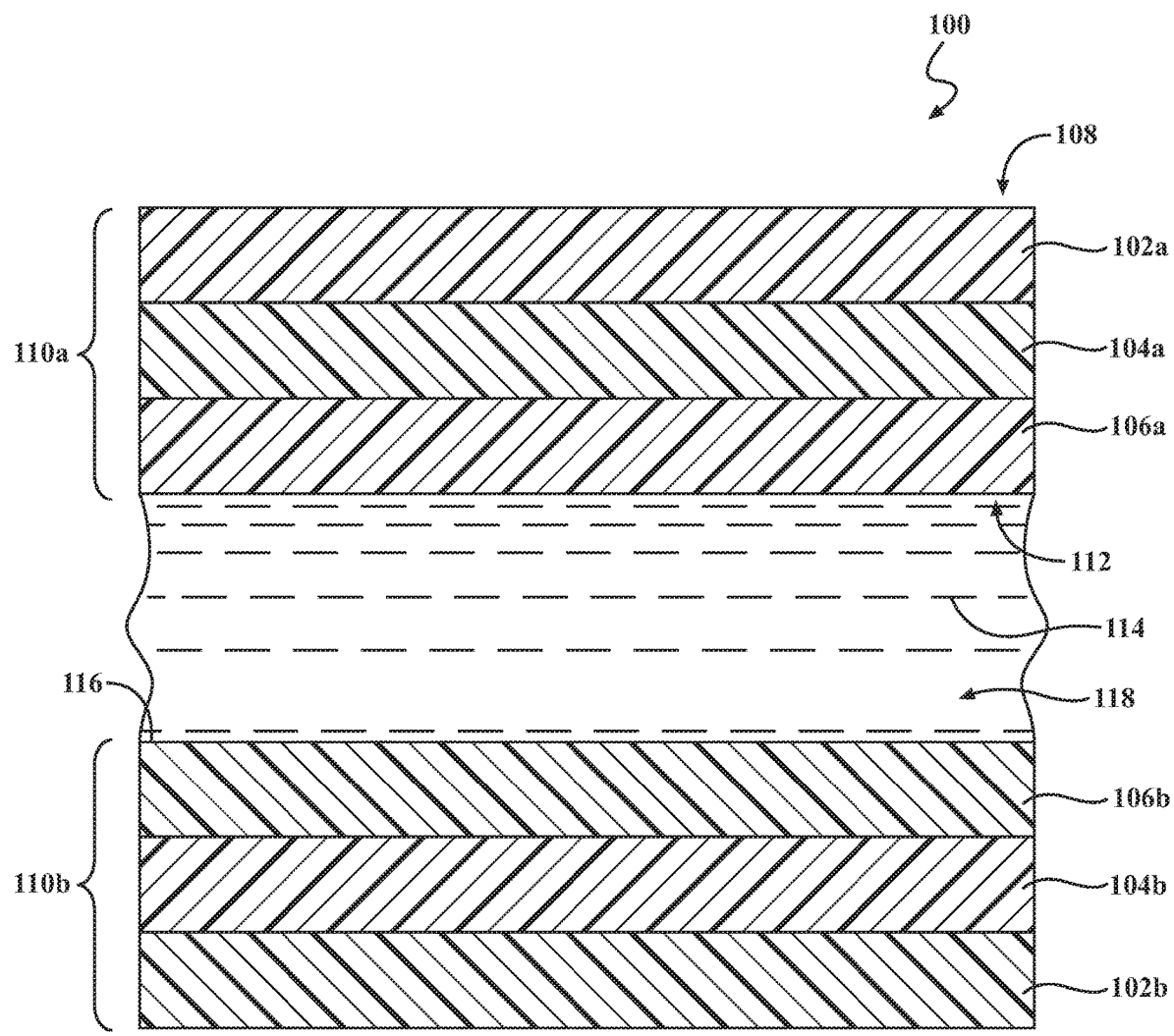
FIGS. 1A-1C are sectional views of an actuator including an electroactive valve, according to one or more implementations.
Figure 1B:
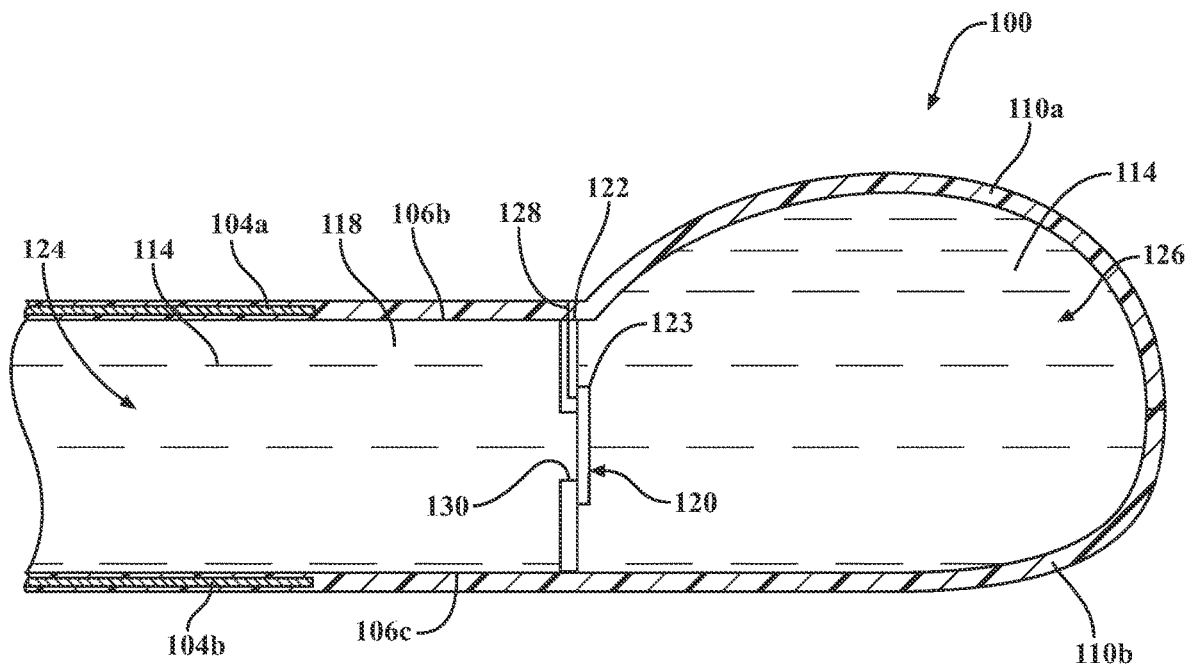
Figure 1C:
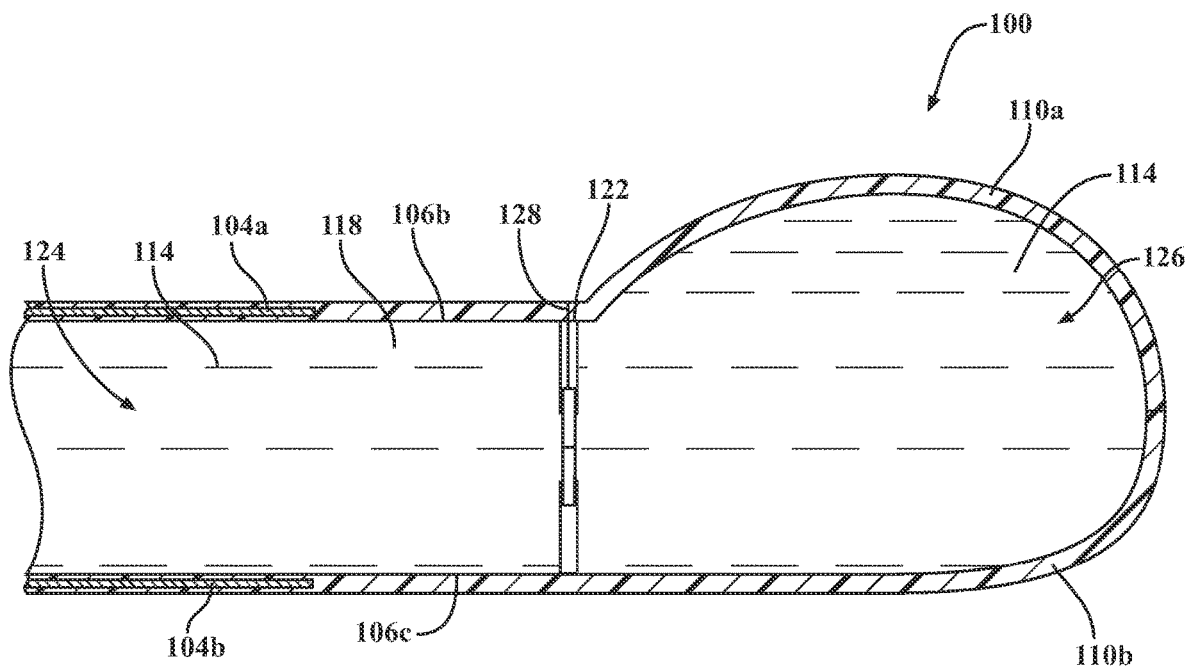

FIGS. 1A-1C are sectional views of an actuator 100, according to one or more implementations. The actuator 100 can be a hydraulic actuator. As will be described herein, the actuator 100 can be configured for connection with a surface and for moving one or more objects. The actuator 100 can be soft, in that the actuator 100 can have a pliable or semi-pliable body. The actuator 100 can be an electrostatic device capable of displacing and/or affecting the flow of a fluid with the application of electric charge. The application of an electric charge can be used to attract two or more conductive elements together into an actuated position. "Actuated position," as used herein, relates to the ability of the actuator 100 to use electrostatic attraction to bring the inner surface of the fluid-impermeable membrane together, thus creating hydraulic force. In one or more implementations, the actuated position is achieved by delivering an electrical input to the conductive portions of the fluid-impermeable membrane, as described herein. "Relaxed position," as used herein, refers to the actuator 100 being in a state of low entropy, without input from electrostatic attraction creating a hydraulic force in the membrane. In one or more implementations, the relaxed position is the original shape of the membrane, in response to stopping the electrical input to the conductive portions. The actuator 100 can be capable of changing shape in the presence of the electric charge, causing fluid pressure to be applied to the components of the fluid-impermeable membranes 110a and 110b. This fluid pressure can then change the shape of the actuator 100, in relation to the elasticity of the fluid-impermeable membranes 110a and 110b. Thus, the actuator 100 has a first shape which is maintained in the absence of an electrical input. The electric charge to the actuator 100 can then be delivered, causing the actuator 100 to achieve to a second state due to hydraulic forces. When the charge is removed, the actuator 100 can then return to the first shape.

As shown here, the actuator 100 includes a fluid-impermeable membranes 110a and 110b and a dielectric fluid 114. The fluid-impermeable membranes 110a and 110b can be composed of layers, such as external insulating portions 102a and 102b, conducting portions 104a and 104b, and internal insulating portions 106a and 106b. "Portion," as used herein, relates to one or more components which form a layer, a portion of a layer, or structure in the fluid-impermeable membranes 110a and 110b of the actuator 100. The portions can have non-uniform coverage or thickness, as desired. The portions above are described as a single, uniform element or layer for simplicity purposes. However, the portions can include one or more of any of the layers, portions of layers, or variations as disclosed herein. As such, the portions may only partially extend the dimensions of the fluid-impermeable membranes 110a and 110b. As well, the portions of the fluid-impermeable membranes 110a and 110b can meet to form a seal, such that a chamber or compartment 118 is formed in the inner region of the fluid-impermeable membrane 110a and 110b.

The fluid-impermeable membranes 110a and 110b, or components thereof (e.g., the external insulating portions 102a and 102b, the conducting portions 104a and 104b, and/or the internal insulating portions 106a and 106b), can be flexible and/or elastic at one or more points and/or across one or more portions of the fluid-impermeable membranes 110a and 110b. In one or more implementations, the fluid-impermeable membranes 110a and 110b, or components thereof, are completely flexible and elastic. In another implementation, the fluid-impermeable membranes 110a and 110b are flexible across the entirety but only elastic across one or more strips of the fluid-impermeable membranes 110a and 110b. In another implementation, the fluid-impermeable membranes 110a and 110b are flexible and elastic at the external insulating portion 102a and 102b and the internal insulating portions 106a and 106b, but neither flexible nor elastic at the conducting portions 104a and 104b. One skilled in the art will understand the variety of combinations of flexibility, elasticity, and positioning of the portions of the fluid-impermeable membranes 110a and 110b, without further explicit recitation of specific examples herein.

The external insulating portion 102a and 102b can form an exterior surface 108 of the fluid-impermeable membranes 110a and 110b. In one or more implementations, the external insulating portion 102a and 102b can form the entire exterior surface of the fluid-impermeable membranes 110a and 110b. The external insulating portion 102a and 102b can be flexible and/or elastic at one or more portions. In one or more implementations, the external insulating portions 102a and 102b are entirely flexible and elastic. In another implementation, the external insulating portion 102a and 102b can have interspersed regions of flexibility, or flexibility and elasticity. The interspersed regions can be in a pattern or random, as desired. The external insulating portion 102a and 102b can form an interface with the surface of one or more inner layers, such as the internal insulating portions 106a and 106b and/or the conducting portions 104a and 104b.

The external insulating portion 102a and 102b can include a polymer, an elastomeric polymer (elastomer) or both. The use of a plurality of different encapsulating elastomers and/or polymers of varying degrees of softness and hardness can be employed. The polymers used in the implementations described herein can further include the addition of a plasticizer, such as phthalate esters. The polymers or elastomers may be natural or synthetic. Examples of elastomers usable as part of the external insulating portion 102a and 102b can include an insulating elastomer, such as nitrile, ethylene propylene diene monomer (EPDM), fluorosilicone (FVMQ), vinylidene fluoride (VDF), hexafluoropropylene (HFP), tetrafluoroethylene (TFE), perfluoromethylvinylether (PMVE), polydimethylsiloxane (PDMS), natural rubber, neoprene, polyurethane, silicone, silicone rubber, or combinations thereof. The external insulating portion 102a and 102b can be described with regards to electrical insulation. The electrical insulation of the external insulating portion 102a and 102b can be described in relation to the dielectric constant, or κ value, of said material, such as having a higher or lower dielectric constant. The term "elastomer," as used herein, means a material which can be stretched by an external force at room temperature to at least twice its original length, and then upon immediate release of the external force, can return to its original length. Room temperature can generally refer to a temperature in a range of from about 20° C. to about 25° C. Elastomers, as used herein, can include a thermoplastic, and may be cross-linked or thermoset.

The conducting portions 104a and 104b can be a largely internal layer of the fluid-impermeable membranes 110a and 110b. The conducting portions 104a and 104b can be conductive to electrical current, such that the conducting portion creates an electric field. In one or more implementations, the conducting portions 104a and 104b are formed between the external insulating portion 102a and 102b and the internal insulating portions 106a and 106b. In another implementation, the conducting portions 104a and 104b can include hydrogels. The conducting portions 104a and 104b can further include a polymer, an elastomeric polymer (elastomer) or both. Examples of elastomers usable as part of the conducting portions 104a and 104b can include nitrile, EPDM, fluorosilicone (FVMQ), vinylidene fluoride (VDF), hexafluoropropylene (HFP), tetrafluoroethylene (TFE), perfluoromethylvinylether (PMVE), polydimethylsiloxane (PDMS), natural rubber, neoprene, polyurethane, silicone, or combinations thereof. The conducting portions 104a and 104b can be composed or further include a conductive material, such as an electrically conductive dopant. Electrically conductive dopants can include silver, gold, platinum, copper, aluminum, or others. In further implementations, the conducting portions 104a and 104b can include inks and adhesives, for the purpose of flexibility and/or conductivity.

The internal insulating portions 106a and 106b can form an interior surface 112 of the fluid-impermeable membranes 110a and 110b. The internal insulating portions 106a and 106b can be composed of a material similar to that of the external insulating portion 102a and 102b. In one or more implementations, the internal insulating portions 106a and 106b can include an insulating elastomer, such as nitrile, EPDM, fluorosilicone (FVMQ), vinylidene fluoride (VDF), hexafluoropropylene (HFP), tetrafluoroethylene (TFE), perfluoromethylvinylether (PMVE), polydimethylsiloxane (PDMS), natural rubber, neoprene, polyurethane, silicone, or combinations thereof. In one or more implementations, the internal insulating portions 106a and 106b can include polymers and elastomers having a high electric breakdown voltage and not electrically conductive. The internal insulating portions 106a and 106b can further include a protective layer 116. The protective layer 116 can be formed between the internal insulating portions 106a and 106b and a dielectric fluid 114. In some arrangements, the protective layer 116 can form a part of the interior surface 112. The protective layer 116 can be uniform or vary in size or composition. Further, the protective layer 116 can be nonconductive and/or resistant to corrosion. In one or more implementations, the protective layer 116 is a flexible and corrosion resistant plastic, such as fluorinated ethylene propylene (FEP).

The fluid-impermeable membranes 110a and 110b can be sealed at one or more edges, such that the fluid-impermeable membranes 110a and 110b can form a fluid-impermeable compartment 118. However, in some implementations, the fluid-impermeable membranes 110a and 110b may not be separate structures, but instead are a unitary structure. The compartment 118 can hold the dielectric fluid 114. The dielectric fluid 114 can be a fluid that is resistant to electrical breakdown and/or provides insulation. In one or more implementations, the dielectric fluid 114 can prevent arcing between one or more opposing layers (e.g., the opposing conducting portions 104). The dielectric fluid 114 can be a lipid based fluid, such as a vegetable oil-based dielectric fluid. In one implementation, the dielectric fluid 114 can be ethylene glycol. The dielectric fluid 114 can be selected based on desired dielectric constant, or κ value.

FIGS. 1B and 1C depict side sectional views of a portion of the actuator 100 having an electroactive valve 120, according to one or more implementations. The side views depict the actuator 100 as an operating unit, according to one or more implementations. In one or more implementations, the fluid-impermeable membranes 110a and 110b, described with reference to FIG. 1A, are disposed against one another. The internal insulating portion 106a and 106b can form the interior surface 112 of the compartment 118. The dielectric fluid 114 can be disposed inside of the compartment 118. One or more electroactive valves 120 can be disposed within the compartment 118. The one or more electroactive valves 120 are capable of selectively subdividing the compartment 118. The one or more electroactive valves 120 can include a barrier 122 and an electro-responsive element 123. The barrier 122 can define an opening 130. In some implementations, the electro-responsive element 123 can be positioned on the barrier 122 (e.g., over the opening 130) to form one or more electroactive valves 120, an example of which is shown in FIG. 1B. In further implementations, the electro-responsive element 123 can be positioned in the barrier 122 (e.g., inside of the opening 130) to form one or more electroactive valves 120, an example of which is shown in FIG. 1C. In some implementations, the electro-responsive element 123 can be attached to the barrier 122 in any suitable manner.

The electroactive valves 120 can subdivide the compartment 118 into at least a central region 124 and an edge region 126. The barrier 122 can be composed of a material substantially similar to one or more materials for the fluid-impermeable membranes 110a and 110b. The central region 124 is a region of the compartment 118 which is in the center of the actuator 100. The central region 124 can include the conductive portions 104a and 104b. The edge region 126 is a region of the compartment 118 which includes the edge of the actuator 100.

The electroactive valves 120 can function to control the flow of the dielectric fluid 114 between the central region 124 and the edge region 126. The electroactive valve 120 can include the electro-responsive element 123. The electro-responsive element 123 can include an electroactive polymer. Materials suitable for use as an electroactive polymer, in the one or more implementations described herein, can include any insulating polymer or rubber (or a combination thereof) that deforms in response to an electrostatic force or whose deformation results in a change in electric field. Exemplary materials suitable for use as an electroactive polymer can include silicone elastomers, acrylic elastomers, polyurethanes, thermoplastic elastomers, copolymers comprising PVDF, pressure-sensitive adhesives, fluoroelastomers, polymers comprising silicone and acrylic moieties, and the like. Polymers, such as those including silicone and acrylic moieties, can include copolymers having silicone and acrylic moieties, polymer blends having a silicone elastomer and an acrylic elastomer, or others. Combinations of some of these materials may also be used as the electro-responsive element 123 in the electroactive valves 120 disclosed herein.

Materials used as an electroactive polymer for the electro-responsive element 123 can be selected based on one or more material properties. Material properties used for selection can include a high electrical breakdown strength, a low modulus of elasticity (such as for controlling the level of deformation), or others. The electro-responsive element 123 used herein can include a wide range of thicknesses to suit the fluid control requirements of the present implementations. The thickness of the electro-responsive element 123 in the electroactive valve 120 can be reduced by stretching an existing polymer film in one or both planar directions, can be fabricated and implemented as thin films, or others.

One or more electrodes 128 can be connected with the electro-responsive element 123 of the electroactive valve 120. The electrodes 128 can be flexible or malleable, such as being capable of deforming or deflecting without compromising mechanical or electrical performance. Generally, electrodes 128 as used herein can be of a shape and material such that they can supply a suitable voltage to or receive a suitable voltage from the electroactive valve 120. The voltage delivered through the electrodes 128 can be either constant or varying over time. In one or more implementations, the electrodes 128 can adhere to a surface of the electroactive valve 120. Electrodes 128, which can adhere to the electroactive valve 120, can be compliant and conform to the changing shape of the electroactive valve 120. In further implementations, the electrodes 128 can be formed in the barrier 122 and/or the electro-responsive element 123 of the electroactive valve 120. Correspondingly, one or more implementations can include compliant electrodes that conform to the shape of the electroactive valve 120 which they are attached to or positioned within. The electrodes 128 can be applied to a portion of the electro-responsive element 123 of the electroactive valve 120 and define an active area according to their geometry.

Figure 2A:
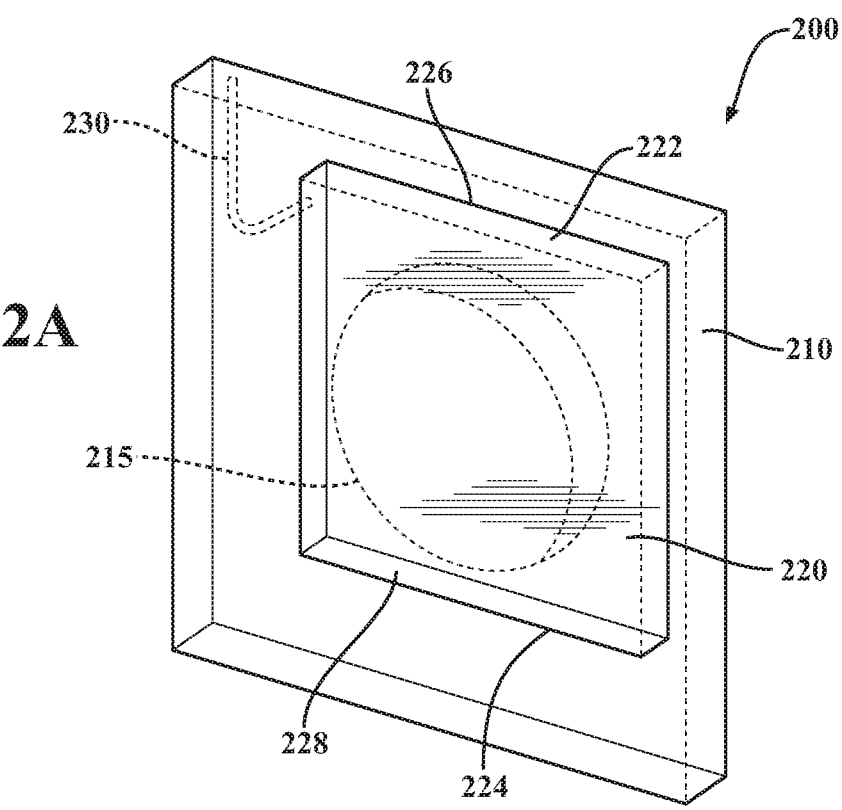
FIGS. 2A and 2B are exemplary illustrations of a flap-style electroactive valve, according to one or more implementations.
Figure 2B:
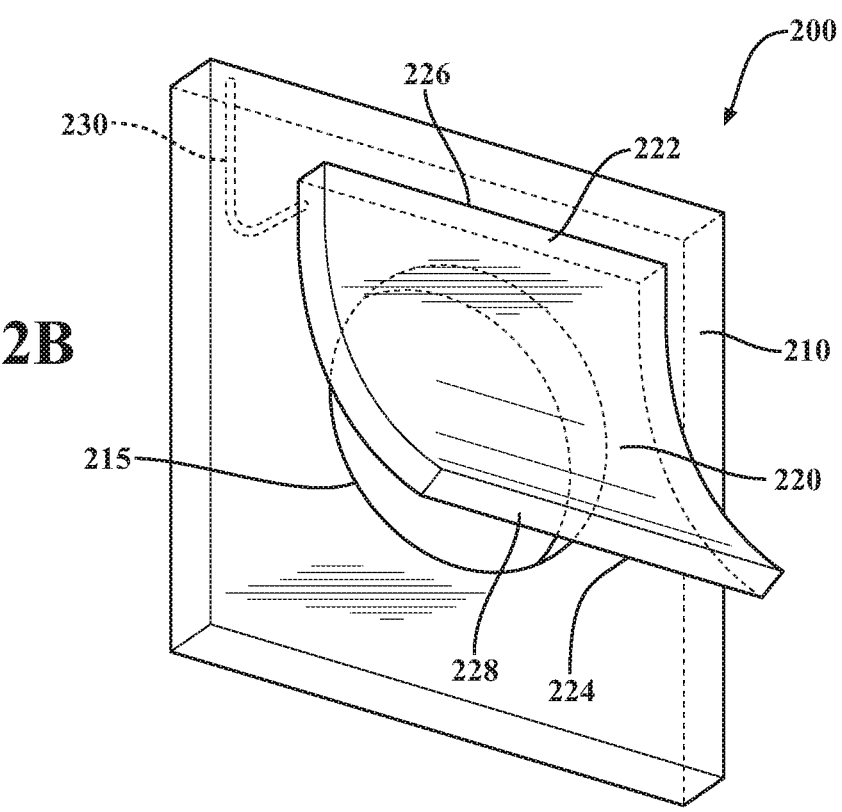

FIGS. 2A and 2B are exemplary illustrations of an electroactive valve 200, according to one or more implementations. The electroactive valve 200 is depicted here as a unit, including a cut-away portion of a barrier 210 and an electro-responsive element 220. The barrier 210 can be a continuous element and/or a plurality of discrete elements. As such, the barrier 210 can be used in conjunction with one or more electro-responsive elements 220 to form one or more of the electroactive valves 200. The formation, composition and other features of the barrier 210 and the electro-responsive element 220 can be substantially similar to the barrier 122 and the electro-responsive element 123 described with reference to FIGS. 1A-1C. The electro-responsive element 220 can further be connected with one or more electrodes 230. The electrode 230 can be substantially similar to the electrode 128, described with reference to FIGS. 1A-1C. The barrier 210 can have one or more openings 215. The openings 215 can be configured to allow the dielectric fluid 114 to controllably move between the central region 124 and an edge region 126, described above with reference to FIGS. 1A-1C. The openings 215 can have any suitable shape, such as circular, polygonal, or irregular.

In one or more implementations, the electro-responsive element 220 can act as a flap or cover over the opening 215. The flap design of the electro-responsive element 220 can include material properties such that the openings 215 are substantially covered and/or occluded. The material properties can include shape and dimensions, material composition, and others. The material composition can include one or more material types and/or combinations of materials. In one implementation, the electro-responsive element 220 can include polymers and electroactive polymers, each described above with reference to FIGS. 1A-1C.

The electro-responsive element 220 can have a variety of dimensions and form one or more shapes or combinations of shapes. Possible shapes for the electro-responsive element 220 can include all primary shapes or combinations thereof, such that the electro-responsive element 220 is capable of covering the one or more openings 215. In the example shown in FIG. 2A, the electro-responsive element 220 is a square-shaped, with a length and width measured from either the first surface 222 and/or the second surface 224. In further implementations, the electro-responsive element 220 can be triangular, circular, hexagonal, or others. Though the sides are depicted as being equal, the electro-responsive element 220 can have different lengths and widths. As well, the electro-responsive element 220 can have a height, as measured between the first surface 222 and the second surface 224. The electro-responsive element 220 can have a high ratio of length and/or width to height, where a high ratio refers to the length and/or width being greater than the height. In one example, the length and/or width to height can be at least 10:1 or 20:1.

The electro-responsive element 220 can have dimensions which accommodate the functions described above, including the first surface 222, the second surface 224, a connecting edge 226 and a flexing edge 228. The electro-responsive element 220 can have the first surface 222 facing away from the barrier 210 and the second surface 224 facing the barrier 210. In further implementations, the electro-responsive element 220 can include a plurality of components which function in unison to cover the openings 215, such as two strips of electroactive polymer which function together as the electro-responsive element 220.

In operation, the electro-responsive element 220 can regulate and/or control fluidic communication between the central region 124 and the edge region 126. When the electro-responsive element 220 is in a passive state (e.g., not receiving an electric current), the electroactive valve 200 can allow the flow of the dielectric fluid 114 through the opening 215 and into the edge region 126. However, the position of the electro-responsive element 220 can limit or prevent return flow of the dielectric fluid 114 from the edge region 126 into the central region 124. The connecting edge 226 of the electro-responsive element 220 can be in connection with the barrier 210, such as being adhered to the barrier 210. The flexing edge 228 can be positioned opposite the connecting edge 226.

When the electro-responsive element 220 is in an active state (e.g., receiving an electric current), the electro-responsive element 220 can move to a second position which return flow of the dielectric fluid 114 is permitted. In one example, when the electro-responsive element 220 receives an electric charge, such as from the electrode 230, the flexing edge 228 can move out and away from the barrier 210. This movement of the electro-responsive element 220 can allow the dielectric fluid to flow through the opening 215. As such, the dielectric fluid can equilibrate between the central region 124 and the edge region 126. The properties of movement for the electro-responsive element 220 can be controlled as desired, including the range and direction of movement, the force of movement, and other facets of the change in position, in accordance with implementations described herein.

Thus, the electroactive valve 200 can control the flow of fluids from either the edge region 126 or the central region 124 with minimal energy input. When in a passive state, the electroactive valve can allow for free flow of fluid into the edge region 126 from the central region 124, while blocking return flow from the edge region 126 into the central region 124. When in an active state, the electroactive valve can allow free flow of fluid between the edge region 126 and the central region 124. Thus, the actuator 100 can be actuated and held in an actuated position without further input from the conductive portion 104a and 104b.

Figure 3A:
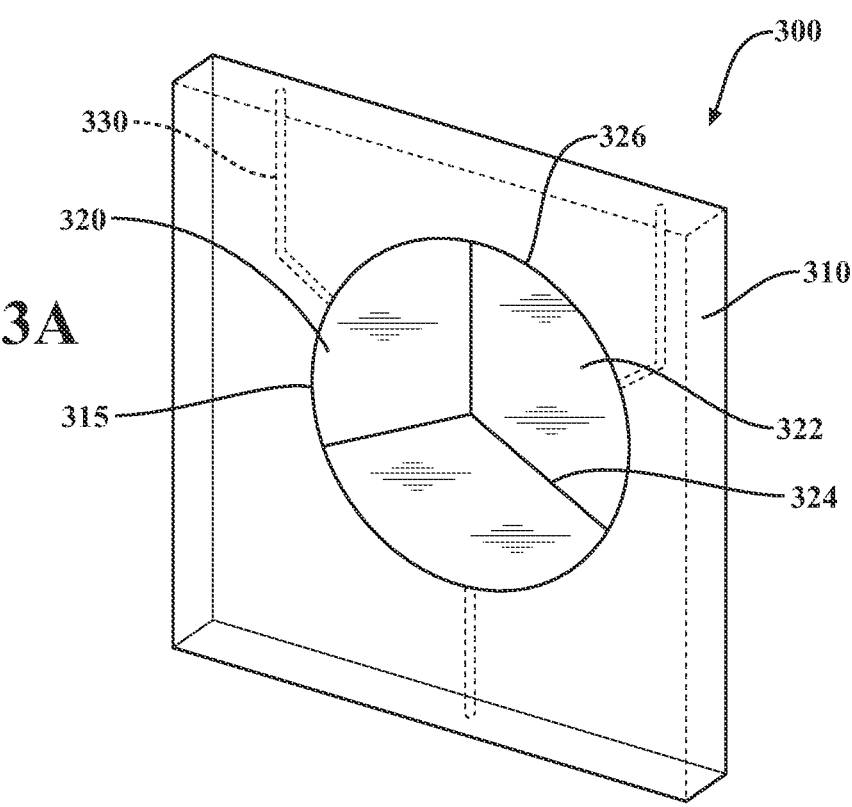
FIGS. 3A and 3B are exemplary illustrations of a tricuspid electroactive valve, according to one or more implementations.
Figure 3B:
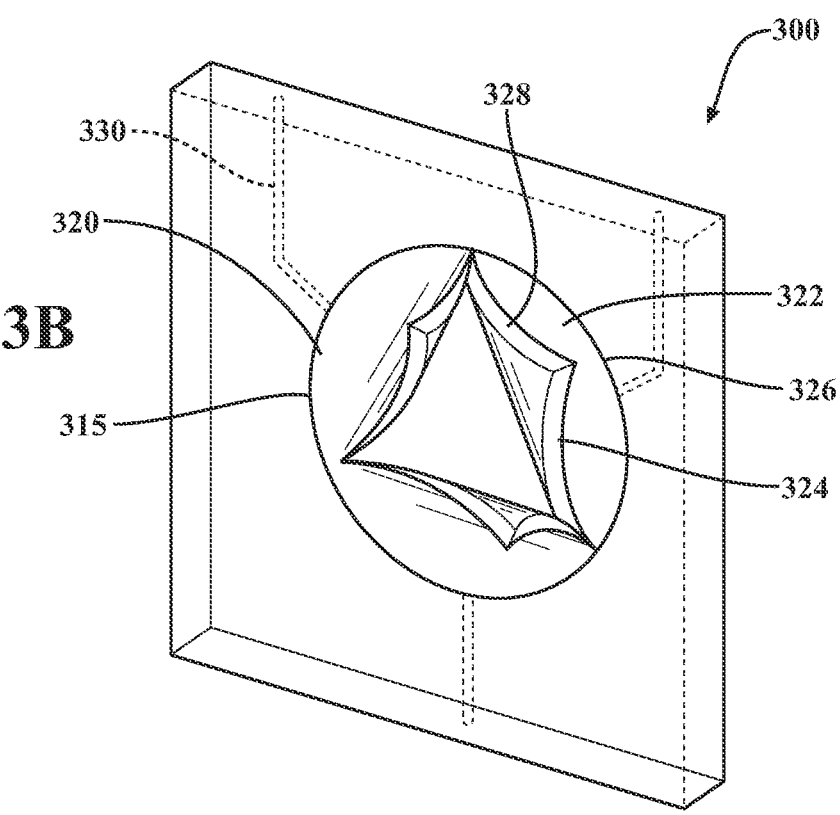

FIGS. 3A and 3B are alternative exemplary illustrations of an electroactive valve 300, according to one or more implementations. The electroactive valve 300 is depicted here as a unit, including a cut-away portion of a barrier 310 and an electro-responsive element 320. As above, the barrier 310 can be a continuous element having one or more electro-responsive elements 320. As such, any number of barriers, such as the barrier 310, can be used to form one or more of the electroactive valves 300. The formation, composition and other features of the barrier 310 and the electro-responsive element 320 can be substantially similar to the barrier 122 and the electro-responsive element 123 described with reference to FIGS. 1A-1C. The electro-responsive element 320 can further be connected with one or more electrodes 330. The electrode 330 can be substantially similar to the electrode 128, described with reference to FIGS. 1A-1C. The barrier 310 can have one or more openings 315. The openings 315 can be configured to allow the dielectric fluid 114 to controllably move between the central region 124 and an edge region 126, described above with reference to FIGS. 1A-1C.

In one or more implementations, the electro-responsive element 320 can act as a moveable occlusion in the opening 315. The design, shown here as a multi-leaf valve, of the electro-responsive element 320 can include material properties such that the opening 315 are substantially covered and/or occluded when in a passive state. A multi-leaf valve is a valve which uses a plurality of leaves to control flow in a unidirectional fashion. The leaves fold into contact with each other at a non-critical angle, such that they can resist the reverse flow of a fluid. One example of a multi-leaf valve is a tricuspid valve. The material properties can include shape and dimensions, material composition, and others, as described above with reference to FIGS. 2A and 2B. The material composition can include one or more material types and/or combinations of materials. In one implementation, the electro-responsive element 320 can include polymers and electroactive polymers, each described above with reference to FIGS. 1A-1C.

The electro-responsive element 320 can have a variety of dimensions and form one or more shapes or combinations of shapes. Possible shapes for the electro-responsive element 320 can include all primary shapes or combinations thereof, such that the electro-responsive element 320 is capable of connecting with and occluding the one or more openings 315. In this example, the electro-responsive element 320 includes three components to form a multi-leaf valve shape. The electro-responsive element 320 can have a length and width measured from either the first surface 322 and/or the second surface 324. In further implementations, the electro-responsive element 320 can be any variety of shapes such that they can tessellate together or otherwise connect without gaps. Though the sides are depicted as being equal, the electro-responsive element 320 can have different lengths and widths. As well, the electro-responsive element 320 can have a height, as measured between the first surface 322 and the second surface 324.

The electro-responsive element 320 can have dimensions which accommodate the functions described above, including a first surface 322, a second surface 324, one or more connecting edges 326 and one or more flexing edges 328. The electro-responsive element 320 can have the first surface 322 facing the edge region 126 and the second surface 324 facing the central region 124. In further implementations, the electro-responsive element 320 can include a plurality of components which function in unison to cover the openings 315, such as bi directional complement of multi-leaf valves with electroactive polymers which function together as the electro-responsive element 320.

In operation, the electro-responsive element 320 can regulate and/or control fluidic communication between the central region 124 and the edge region 126. When the electro-responsive element 320 is in a passive state (e.g., not receiving an electric current), the electroactive valve 300 can allow the flow of the dielectric fluid 114 through the opening 315 and into the edge region 126. The multi-leaf design can allow free bending of the electro-responsive element 320 in the direction of the edge region 126. However, the position of the electro-responsive element 320 can limit or prevent return flow of the dielectric fluid 114 into the central region 124 (e.g., the electro-responsive element 320 closes in response to fluid flow toward the central region 124). The connecting edges 326, shown here as three (3) connecting edges 326, of the electro-responsive element 320 can be in connection with the barrier 310. In one example, the connecting edges 326 can be connected to the barrier 310, such as at the wall of the opening 315. The flexing edges 328, shown here as three (3) flexing edges, can be positioned opposite the connecting edge 326, forming a seal between each of the flexing edges 328. In some instances, the flexing edges 328 of the leaves can seal against each other. In some instances, there can be overlap between portions of the leaves.

When the electro-responsive element 320 is in an active state (e.g., receiving an electric current), the flexing edges 328 of the electro-responsive element 320 can move to a second position which allows for return flow of the dielectric fluid 114. In one example, when the electro-responsive element 320 receives an electric charge, such as from the electrode 330, the flexing edges 328 can move out and away from the barrier 310, such as toward the edge region 126. This movement of the electro-responsive element 320 can allow the dielectric fluid to flow through the opening 315. As such, the dielectric fluid can equilibrate between the central region 124 and the edge region 126. The properties of movement for the electro-responsive element 320 can be controlled as desired, including the range and direction of movement, the force of movement, and other facets of the change in position, in accordance with implementations described herein.

Thus, the electroactive valve 300 can control the flow of fluids from either the edge region 126 or the central region 124 with minimal energy input. When in a passive state, the electroactive valve can allow for free flow of fluid into the edge region 126 from the central region 124, while blocking return flow from the edge region 126 into the central region 124. When in an active state, the electroactive valve can allow free flow of fluid between the edge region 126 and the central region 124. Thus, the actuator 100 can be actuated and held in an actuated position without further input from the conductive portion 104a and 104b.

Figure 4A:
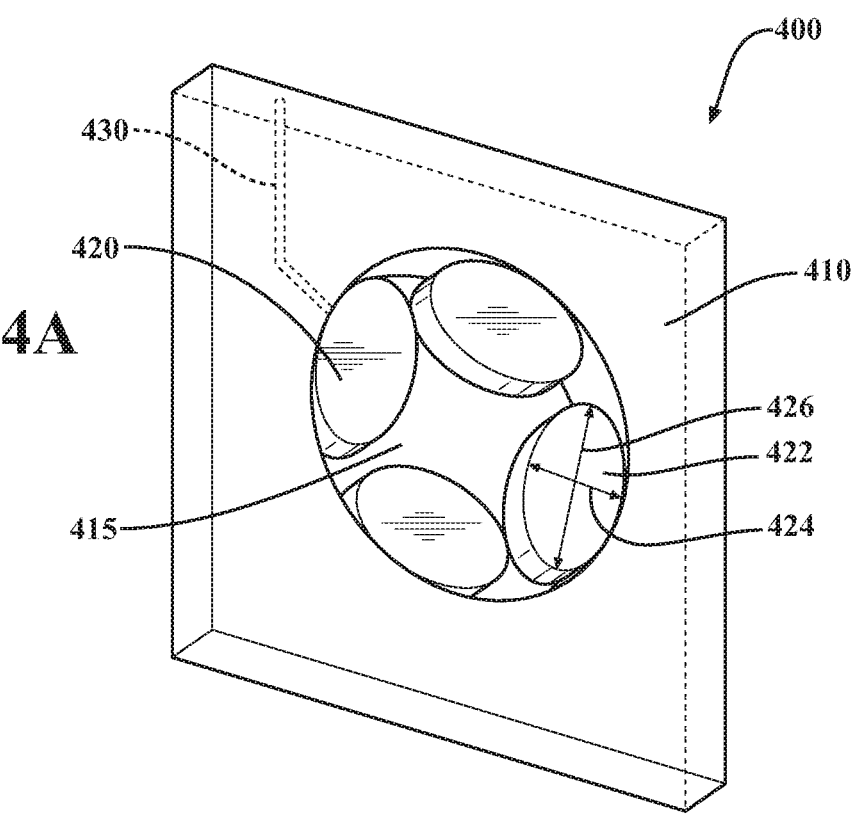
FIGS. 4A and 4B are exemplary illustrations of an expanding electroactive valve, according to one or more implementations.
Figure 4B:
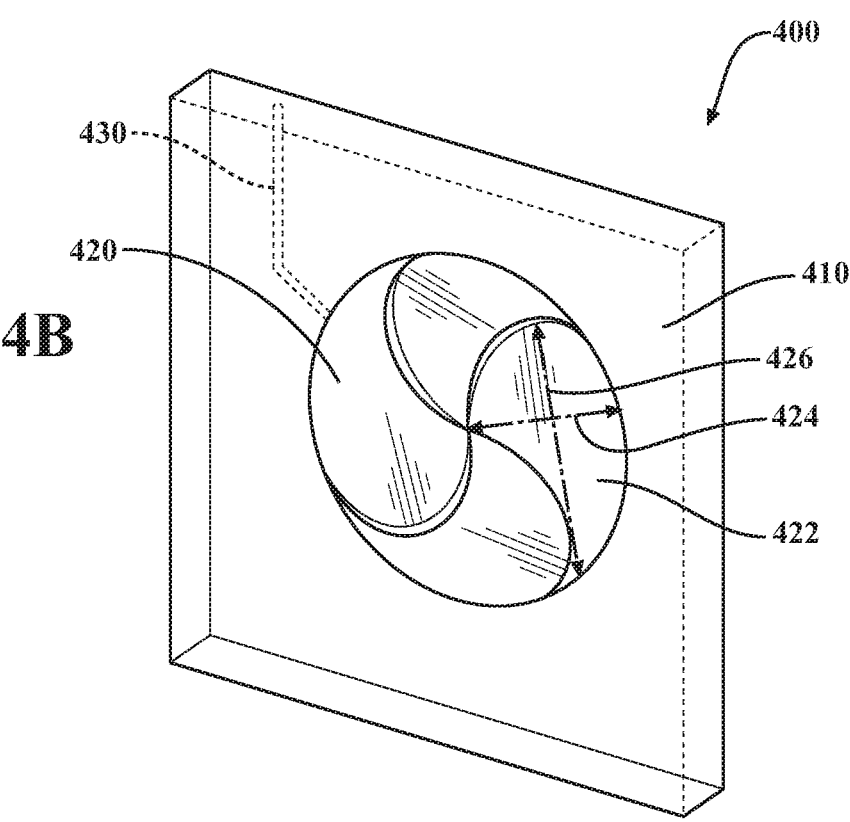

FIGS. 4A and 4B are exemplary illustrations of an expanding electroactive valve 400, according to one or more implementations. The electroactive valve 400 is depicted here as a unit, including a cut-away portion of a barrier 410 and an electro-responsive element 420. As above, the barrier 410 can be a continuous element having one or more electro-responsive elements 420. As such, any number of barriers, such as the barrier 410, can be used to form one or more of the electroactive valves 400. The formation, composition and other features of the barrier 410 and the electro-responsive element 420 can be substantially similar to the barrier 122 and the electro-responsive element 123 described with reference to FIGS. 1A-1C. The electro-responsive element 420 can further be connected with one or more electrodes 430. The electrode 430 can be substantially similar to the electrode 128, described with reference to FIGS. 1A-1C. The barrier 410 can have one or more openings 415. The openings 415 can be configured to allow the dielectric fluid 114 to controllably move between the central region 124 and an edge region 126, described above with reference to FIGS. 1A-1C.

In one or more implementations, the electro-responsive element 420 can act as a moveable occlusion in the opening 415. The design, shown here as an expanding valve, of the electro-responsive element 420 can include material properties such that the opening 415 are substantially covered and/or occluded when in an active state. The material properties can include shape and dimensions, material composition, and others, as described above with reference to FIGS. 2A and 2B. The material composition can include one or more material types and/or combinations of materials. In one implementation, the electro-responsive element 420 can include polymers and electroactive polymers, each described above with reference to FIGS. 1A-1C.

The electro-responsive element 420 can have a variety of dimensions and form one or more shapes or combinations of shapes. Possible shapes for the electro-responsive element 420 can include all primary shapes or combinations thereof, such that the electro-responsive element 420 is capable of connecting with and occluding the one or more openings 415. In this example, the electro-responsive element 420 includes four expanding oval components to form an overlapping occlusion. The electro-responsive element 420 can have dimensions which accommodate the functions described above, including a first surface 422 which forms the surface of the electro-responsive element 420, a first diameter 424, and a second diameter 426. In further implementations, the electro-responsive element 420 can include more or fewer components which function in unison to cover the openings 415, such as six (6) spheroids of electroactive polymer which function together as the electro-responsive element 420.

In operation, the electro-responsive element 420 can regulate and/or control fluidic communication between the central region 124 and the edge region 126. When the electro-responsive element 420 is in a passive state (e.g., not receiving an electric current), the electroactive valve 400 can allow the flow of the dielectric fluid 114 through the opening 415 and into the edge region 126. The expanding oval design can allow free flow of the dielectric fluid 114 in the direction of the edge region 126 or the central region 124. The electro-responsive element 420, shown here as four (4) electro-responsive element 420, can be in connection with the barrier 410. In one example, the electro-responsive element 420 can be adhered to the barrier 410, at the wall of the opening 415. The first surface 422 can form an opening allowing free flow of fluid through the opening 415 and around the electro-responsive element 420.

When the electro-responsive element 420 is in an active state (e.g., receiving an electric current), the first surface 422 of the electro-responsive element 420 can expand to a second position which blocks the flow of the dielectric fluid 114 in either direction. The first diameter 424 and the second diameter 426 can be capable of or configured to expand, causing the first surface 422 of each component of the electro-responsive element 420 to come in contact. In one example, when the electro-responsive element 420 receives an electric charge, such as from the electrode 430, the first surface 422 of the electro-responsive element 420 can move out and away from the wall of the opening 415 toward the other components of the electro-responsive element 420. This movement of the electro-responsive element 420 can create an occlusion and block the dielectric fluid 114 from flowing through the opening 415. As such, the dielectric fluid 114 can be held in either the central region 124 or the edge region 126. The properties of movement for the electro-responsive element 420 can be controlled as desired, including the range and direction of movement, the force of movement, and other facets of the change in position, in accordance with implementations described herein.

Thus, the electroactive valve 400 can control the flow of fluids from either the edge region 126 or the central region 124 with minimal energy input. The electroactive valve allows for free flow of fluid between the edge region 126 and the central region 124, when in a passive state. When in an active state, the electroactive valve blocks the flow of fluid between the edge region 126 and the central region 124. Thus, the actuator 100 can be actuated and held in an actuated position without further input from the conductive portion 104a and 104b.

FIGS. 5A-5D are depictions of a series of movements from an example of an actuator 500, according to one or more implementations. The actuator 500 can include a fluid-impermeable membrane 502, including an insulating portion 503 with a plurality of conductive portions 504a, 504b disposed therein. The fluid-impermeable membrane 502 can define a compartment 506. The compartment 506 can hold a dielectric fluid 508. Further, the compartment 506 can be subdivided into a central region 510 and an edge region 512 by an electroactive valve 514. The electroactive valve 514 can include a barrier 516, an electro-responsive element 518, and an opening 519. The electro-responsive element 518 can be connected with an electrode 520 and/or a control unit 522. The actuator 500 and/or components thereof can be substantially similar to the actuator 100, described with reference to FIGS. 1A-1C. The electroactive valve 514 can be substantially similar to the electroactive valves described with reference to FIGS. 2A-4B.

FIG. 5A depicts the actuator 500 in a relaxed state. The dielectric fluid 508 can be substantially evenly dispersed across the central region 510 and the edge region 512. The conductive portions 504a, 504b can be in a passive state, not receiving an electric input. As such, the hydraulic force delivered by dielectric fluid 508 in conjunction with the fluid-impermeable membrane 502 can be equal throughout the actuator 500. As well, the electro-responsive element 518 of the electroactive valve 514 can be in a passive state, allowing unidirectional or bi directional flow through the opening 519, based on the type of electroactive valve 514. As shown here, the electro-responsive element 518 can allow unidirectional flow through the opening 519, from the central region 510 into the edge region 512.

FIG. 5B depicts the actuator 500 in an active state. Here, the conductive portions 504a, 504b can receive an electric input, which transitions the conductive portions 504a, 504b from the passive state to an active state. The conductive portions 504a, 504b can be oppositely charged and, thus, are attracted toward each other. The dielectric fluid 508 can be forced by the contraction in the central region 510 into the edge region 512 through the opening 519. As such, the hydraulic force delivered by dielectric fluid 508 in conjunction with the fluid-impermeable membrane 502 of the central region 510 can expand the fluid-impermeable membrane 502 in the edge region 512. During this time, the electro-responsive element 518 of the electroactive valve 514 can be in a passive state, allowing unidirectional flow from the central region 510 into the edge region 512.

In the active state, fluid pressure from the dielectric fluid can be initially higher in the central region 510 than the edge region 512. The electro-responsive element 518 of the electroactive valve 514 allows the flow of the dielectric fluid 508 through the opening 519 from the central region 510 into the edge region 512. The hydraulic force can continue until the pressure from the edge region is equal to the pressure from the central region 510, or until the dielectric fluid has moved entirely over into the edge region 512. The fluid-impermeable membrane 502 in the edge region 512 can be expanded in relation to the elasticity of the fluid-impermeable membrane 502.

Figure 5C:
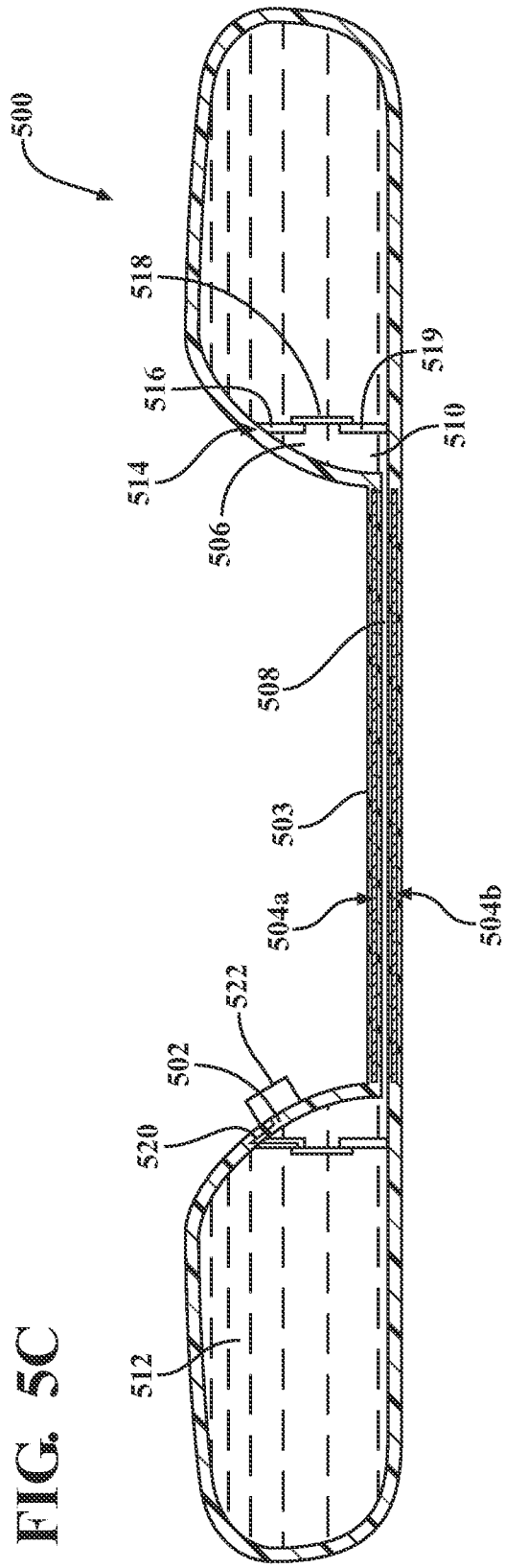

FIG. 5C depicts the actuator 500 in a locked passive state. Here, the electric input has been removed from the conductive portions 504a, 504b, which allows the conductive portions 504a, 504b to move into the passive state from the active state. The conductive portions 504a, 504b are no longer attracted to each other. The dielectric fluid 508, being previously forced by the contraction in the central region 510 into the edge region 512 through the opening 519, is maintained by the electro-responsive element 518. The hydraulic force delivered by dielectric fluid 508 in conjunction with the fluid-impermeable membrane 502 of the central region 510 can be held in place by the electro-responsive element 518. Thus, the electro-responsive element 518 maintains the expansion of the fluid-impermeable membrane 502 in the edge region 512.

In the locked passive state, the electro-responsive element 518 of the electroactive valve 514 blocks return flow through the opening 519 from the edge region 512 into central region 510. The electro-responsive element 518 is shown here as a strip attached at a first end to the barrier 516 and comprising an electroactive polymer. As the electro-responsive element 518 is not permeable, the hydraulic force applies an equal force to the fluid-impermeable membrane 502 and the electro-responsive element 518. The hydraulic force thus compresses the electro-responsive element 518 against the barrier so as to cover the opening 519 creating a seal. As such, a hydraulic force is delivered to the edge region 512 and maintained by the electro-responsive element 518.

Figure 5D:
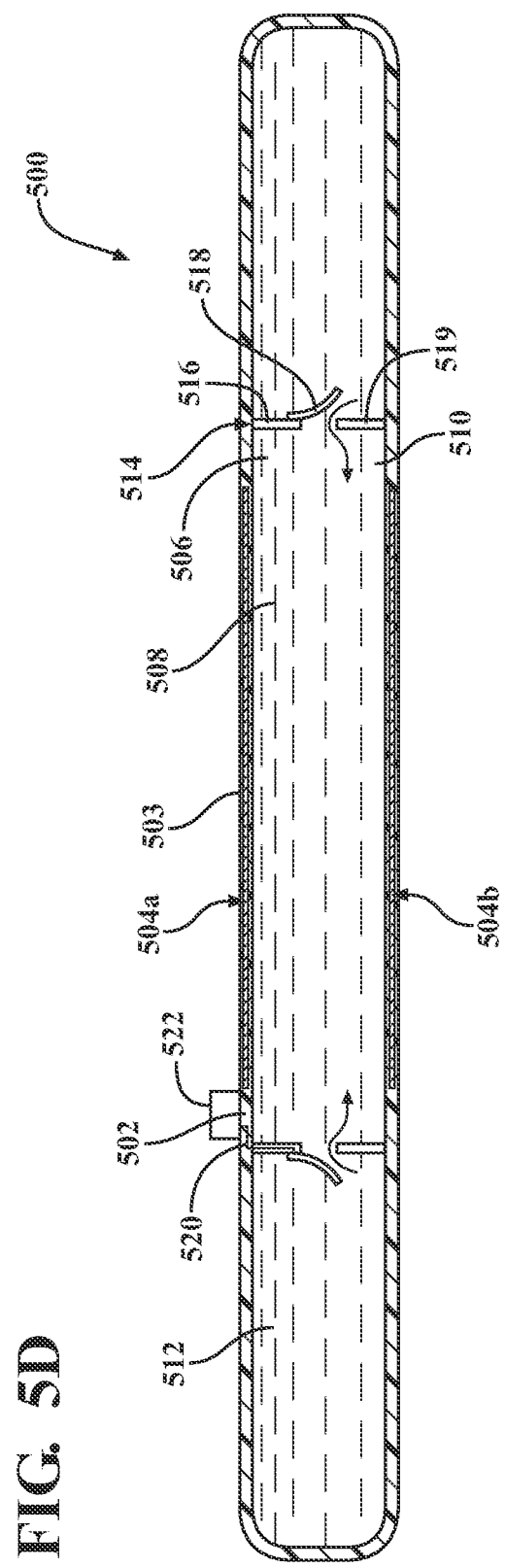

FIG. 5D depicts the actuator 500 in an unlocked passive state. The electro-responsive element 518 can receive an electric input from the electrode 520 and/or the control unit 522 to create a physical movement of the electro-responsive element 518 so as to at least partially unblock the opening 519 of the electroactive valve 514. The hydraulic force delivered by dielectric fluid 508 in conjunction with the fluid-impermeable membrane 502 of the edge region 512 can be released by the electro-responsive element 518. Thus, the dielectric fluid 508 once again equilibrates between the central region 510 and the edge region 512.

In the active state, the electro-responsive element 518 of the electroactive valve 514 moves away from the opening 519 between the edge region 512 and the central region 510. The electro-responsive element 518 comprising an electro-active polymer can move away from or otherwise allow flow through the opening 519 of the barrier 516. The electro-responsive element 518 can respond to the electric input in a number of ways, including lifting away from (as shown in FIGS. 2A and 2B), contracting/expanding (as shown in FIGS. 4A and 4B), separating (as shown in FIGS. 3A and 3B). The electro-responsive element 518 thus breaks the seal against the opening 519 allowing the dielectric fluid 508 to return to other regions of the actuator 500.

Thus, the actuator 500 can be configured to lock the actuator 500 in an active state. The actuator 500 can have a first conductive portion 504a comprising a conductive material. The first conductive portion 504a can be configured to produce an electric field in response to a first electrical input. The actuator 500 can further have a second conductive portion 504b comprising a conductive material. The second conductive portion 504b can be positioned opposite the first conductive portion 504a. The second conductive portion 504b can be configured to attract to the first conductive portion 504a in response to the first electrical input. The actuator 500 can further include the insulating portion 503 as part of the fluid-impermeable membrane 502. The insulating portion 503 can be configured to electrically isolate the first conductive portion 504a from the second conductive portion 504b. The actuator 500 can include the compartment 506, as defined by the insulating portion 503. The compartment 506 can include the dielectric fluid 508 and can be configured to deliver a hydraulic force of the dielectric fluid 508 to at least the insulating portion 503 in response to activation and/or adherence of the first conductive portion 504a and the second conductive portion 504b. The actuator 500 can further include an electroactive valve 514 positioned within the compartment 506. The electroactive valve 514 can be configured to maintain the hydraulic force on the insulating portion 503. The electroactive valve 514 can further be configured to release the hydraulic force upon receiving a second electrical input, such as from the electrode 520 and/or the control unit 522.

The actuator 500 described herein can provide numerous benefits. By locking in an activated state, the actuator 500 can deliver force through hydraulic pressure without further energy input. Thus, lift moving or otherwise displacing an object can be done in a more energy efficient fashion and over a longer period of time. Further, the actuator 500 can deliver hydraulic force in stages, such as when using more than one pair of conductive portions for actuation.

In the description above, certain specific details are outlined in order to provide a thorough understanding of various implementations. However, one skilled in the art will understand that the invention may be practiced without these details. In other instances, well-known structures have not been shown or described in detail to avoid unnecessarily obscuring descriptions of the implementations. Unless the context requires otherwise, throughout the specification and claims which follow, the word "comprise" and variations thereof, such as, "comprises" and "comprising" are to be construed in an open, inclusive sense, that is, as "including, but not limited to." Further, headings provided herein are for convenience only and do not interpret the scope or meaning of the claimed invention.

Reference throughout this specification to "one or more implementations" or "an implementation" means that a particular feature, structure or characteristic described in connection with the implementation is included in at least one or more implementations. Thus, the appearances of the phrases "in one or more implementations" or "in an implementation" in various places throughout this specification are not necessarily all referring to the same implementation. Furthermore, the particular features, structures, or characteristics may be combined in any suitable manner in one or more implementations. Also, as used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

Detailed implementations are disclosed herein. However, it is to be understood that the disclosed implementations are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various implementations are shown in FIGS. 1-5, but the implementations are not limited to the illustrated structure or application.

The flowcharts and block diagrams in the figures illustrate the architecture, functionality, and operation of possible implementations of systems, methods, devices, and computer program products according to various implementations. In this regard, each block in the flowcharts or block diagrams can represent a module, segment, or portion of code, which can include one or more executable instructions for implementing the specified logical function(s). It should also be noted that, in some alternative implementations, the functions noted in the block can occur out of the order noted in the figures. For example, two blocks shown in succession can, in fact, be executed substantially concurrently, or the blocks can sometimes be executed in the reverse order, depending upon the functionality involved.

The systems, components and/or methods described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or methods also can be embedded in a computer-readable storage, such as a computer program product or other data programs storage device, readable by a machine, tangibly embodying a program of instructions executable by the machine to perform methods and methods described herein. These elements also can be embedded in an application product which can include all the features enabling the implementation of the methods described herein and, which when loaded in a processing system, can carry out these methods.

The headings (such as "Background" and "Summary") and sub-headings used herein are intended only for general organization of topics within the present disclosure and are not intended to limit the disclosure of the technology or any aspect thereof. The recitation of multiple implementations having stated features is not intended to exclude other implementations having additional features, or other implementations incorporating different combinations of the stated features. As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an implementation can or may comprise certain elements or features does not exclude other implementations of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an implementation or particular system is included in at least one or more implementations or aspect. The appearances of the phrase "in one aspect" (or variations thereof) are not necessarily referring to the same aspect or implementation. It should also be understood that the various method steps discussed herein do not have to be carried out in the same order as depicted, and not each method step is required in each aspect or implementation.

The terms "a" and "an," as used herein, are defined as one as or more than one. The term "plurality," as used herein, is defined as two or more than two. The term "another," as used herein, is defined as at least a second or more. The terms "including" and/or "having," as used herein, are defined as including (i.e., open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g., AB, AC, BC or ABC).

The preceding description of the implementations has been provided for purposes of illustration and description. It is not intended to be exhaustive or to limit the disclosure. Individual elements or features of a particular implementation are generally not limited to that particular implementation, but, where applicable, are interchangeable and can be used in a selected implementation, even if not specifically shown or described. The same may also be varied in many ways. Such variations should not be regarded as a departure from the disclosure, and all such modifications are intended to be included within the scope of the disclosure.

While the preceding is directed to implementations of the disclosed devices, systems, and methods, other and further implementations of the disclosed devices, systems, and methods can be devised without departing from the basic scope thereof. The scope thereof is determined by the claims that follow.

What is claimed is:

1. An actuator comprising:
   a membrane comprising:
      a first conductive portion comprising a conductive material and configured to produce an electric field in response to a first electrical input;
      a second conductive portion comprising a conductive material, the second conductive portion being positioned opposite the first conductive portion and configured to attract to the first conductive portion in response to the first electrical input;

an insulating portion comprising an elastomer configured to electrically isolate the first conductive portion from the second conductive portion, the insulating portion defining an interior surface and an exterior surface of the membrane;

a compartment defined by the membrane and having a dielectric fluid, the compartment being configured to deliver a hydraulic force to the membrane in response to adherence of the first conductive portion and the second conductive portion; and an electroactive valve positioned within the compartment and configured to maintain the hydraulic force on the membrane and release the hydraulic force upon receiving a second electrical input, the first conducting portion and the second conducting portion being positioned opposite each other across the compartment.

2. The actuator of claim 1, wherein the insulating portion contains one or more polymers, the polymers being configured to control direction of elasticity.

3. The actuator of claim 1, wherein the compartment comprises a central region and an edge region, the first conducting portion and the second conducting portion being positioned in the central region.

4. The actuator of claim 1 wherein the electroactive valve comprises an electro-responsive element positioned in the compartment, the electro-responsive element being in connection with a barrier.

5. The actuator of claim 4, wherein the electro-responsive element comprises an electroactive polymer.

6. An actuator comprising:
a fluid-impermeable membrane; and
a compartment defined by the fluid-impermeable membrane, the compartment having:
a central region;
an edge region extending from and fluidly connected with the central region;
a dielectric fluid; and
an electroactive valve between the central region and the edge region, the electroactive valve being configured to selectively permit movement of the dielectric fluid between the central region and the edge region,
the fluid-impermeable membrane including a first fluid-impermeable membrane portion and a second fluid-impermeable membrane portion, the first and second fluid-impermeable membrane portions each including:
an internal insulating portion defining at least a portion of the compartment;
an external insulating portion defining an exterior surface of the fluid-impermeable membrane; and
a conducting portion located between the internal insulating portion and the external insulating portion,
the conducting portion of the first fluid-impermeable membrane portion and the conducting portion of the second fluid-impermeable membrane portion being positioned opposite each other.

7. The actuator of claim 6, wherein the internal insulating portion of at least one of the first fluid-impermeable membrane portion and the second fluid-impermeable membrane portion contains one or more polymers, and wherein the polymers are configured to control direction of elasticity.

8. The actuator of claim 6, wherein the conducting portion of at least one of the first fluid-impermeable membrane portion and the second fluid-impermeable membrane portion includes a plurality of conducting portions.

9. The actuator of claim 8, wherein the plurality of conducting portions are positioned in the central region.

10. The actuator of claim 6, wherein the electroactive valve comprises an electro-responsive element positioned in the compartment, the electro-responsive element being in connection with a barrier.

11. The actuator of claim 10, wherein the electro-responsive element is an electroactive polymer.

12. The actuator of claim 10, wherein the electro-responsive element includes a plurality of independently controllable subsections.

13. The actuator of claim 6, wherein the first fluid-impermeable membrane portion and the second fluid-impermeable membrane portion are a unitary structure.

14. An actuator comprising:
a fluid-impermeable membrane; and
a compartment defined by an interior surface of the fluid-impermeable membrane, the compartment having:
a central region;
an edge region extending from and fluidly connected with the central region;
a dielectric fluid; and
an electroactive valve between the central region and the edge region,
the fluid-impermeable membrane including:
an insulating portion defining the interior surface and an exterior surface of the fluid-impermeable membrane, the interior surface defining at least a portion of the compartment, the insulating portion comprising an insulating elastomer;
a first conducting portion positioned within the insulating portion, the first conducting portion comprising a conductive material; and
a second conducting portion positioned within the insulating portion, the second conducting portion comprising a conductive material; the first conducting portion and the second conducting portion being positioned opposite each other across the compartment.

15. The actuator of claim 14, wherein the insulating portion contains one or more polymers, the polymers being configured to control direction of elasticity.

16. The actuator of claim 14, wherein the first conducting portion and the second conducting portion are positioned in the central region.

17. The actuator of claim 14, wherein the electroactive valve comprises an electro-responsive element positioned in the compartment, the electro-responsive element being in connection with a barrier.

18. The actuator of claim 17, wherein the electro-responsive element is a multi-leaf valve.

19. The actuator of claim 17, wherein the electro-responsive element comprises an electroactive polymer.

20. The actuator of claim 17, wherein the electro-responsive element includes a plurality of independently controllable subsections.

* * * * *